UNITED STATES PATENT OFFICE.

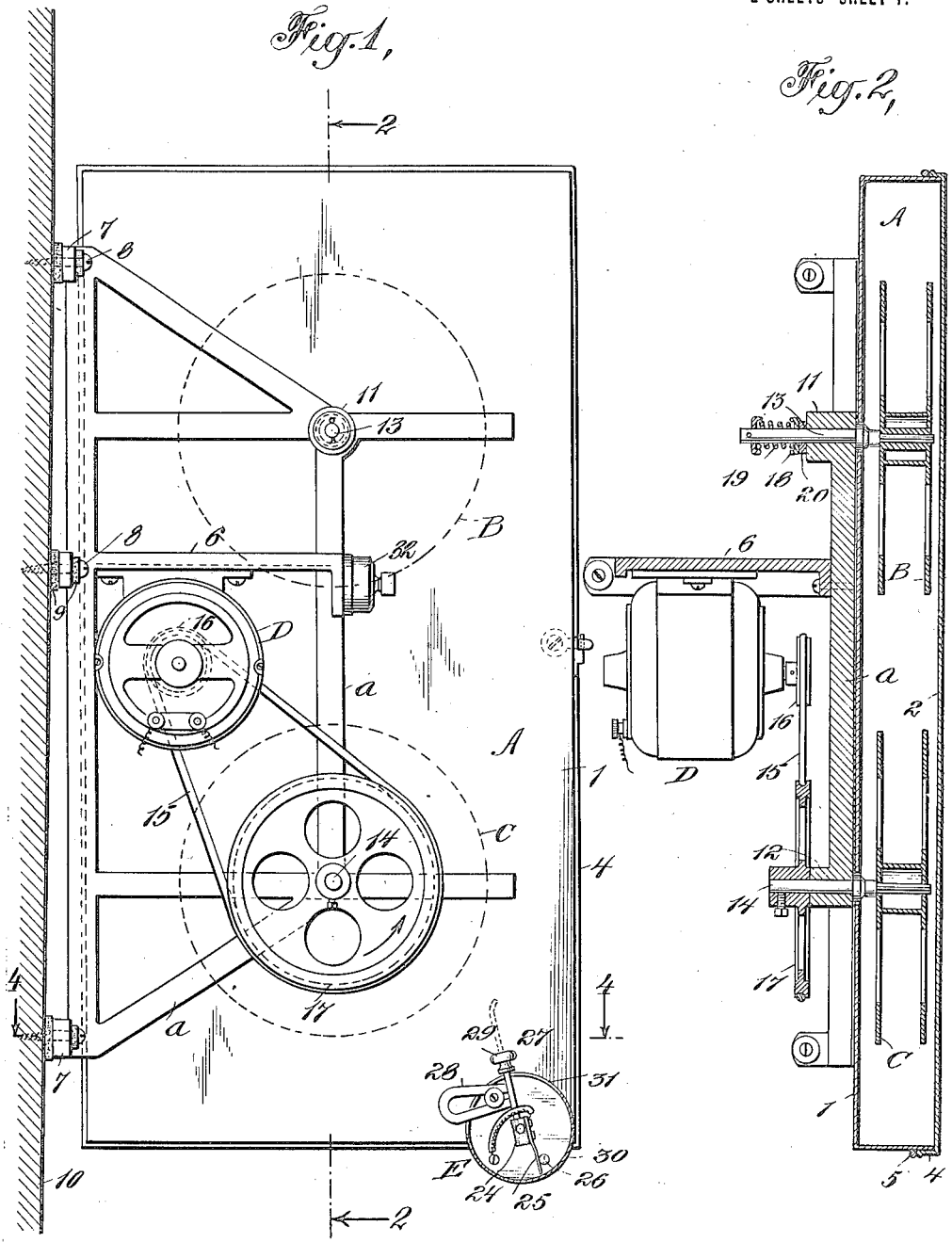

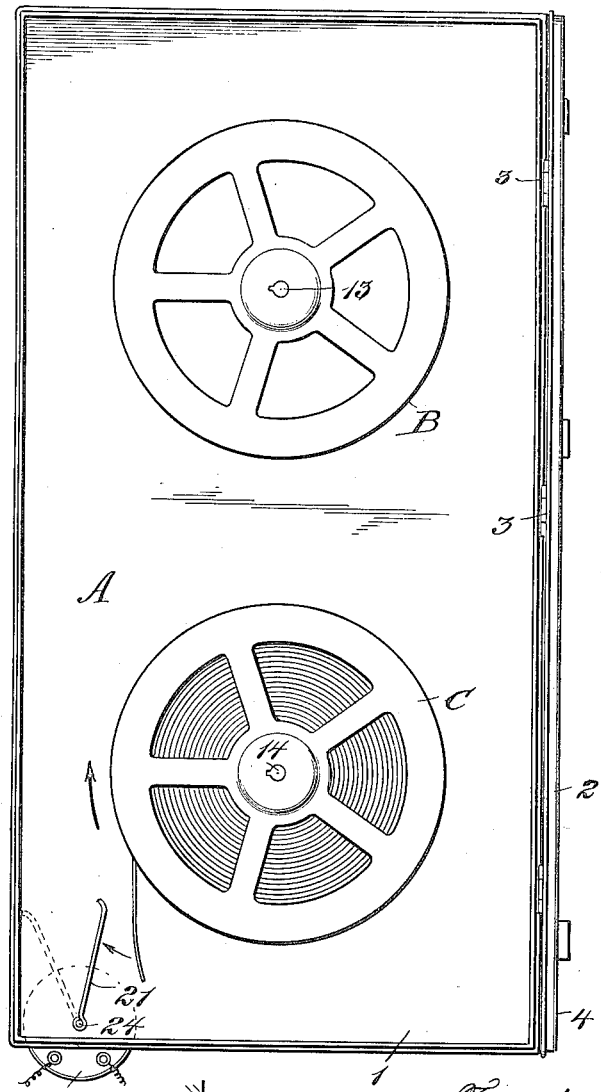
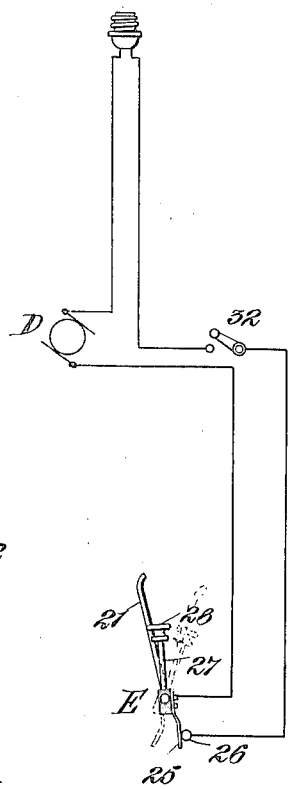

WILLIAM O. WORMAN, OF OGDEN, UTAH.

MOVING-PICTURE-FILM-REWINDING APPARATUS.

1,222,505. Specification of Letters Patent. Patented Apr. 10, 1917.

Application filed May 12, 1916. Serial No. 97,001.

*To all whom it may concern:*

Be it known that I, WILLIAM O. WORMAN, a citizen of the United States, and a resident of Ogden, in the county of Weber and State of Utah, have invented a new and Improved Moving-Picture-Film-Rewinding Apparatus, of which the following is a full, clear, and exact description.

This invention relates to rewinding mechanism for moving picture films.

The invention has for its general objects to provide a rewinding device of comparatively simple, inexpensive and durable construction, embodying a fireproof box for containing the reels, in combination with an electric motor drive for operating the reel on which the film is rewound.

More specifically, the object of the invention is the provision of a simple and effective cut-out device or switch for opening the motor circuit when the film is fully rewound.

With such objects in view, and others which will appear as the description proceeds, the invention comprises various novel features of construction and arrangement of parts which will be set forth with particularity in the following description and claims appended hereto.

In the accompanying drawing which illustrates one embodiment of the invention and wherein similar characters of reference indicate corresponding parts in all the views, Figure 1 is a side view of the apparatus mounted for use;

Fig. 2 is a vertical section on the line 2—2, Fig. 1;

Fig. 3 is an inside view with the door of the box open;

Fig. 4 is a horizontal section on the line 4—4, Fig. 1; and

Fig. 5 is a diagrammatic view of the circuit connections.

Referring to the drawing, A designates the box, B and C the upper and lower reels, D the motor, and E the automatic cut-out for the motor.

The box A is made of sheet metal and comprises a body 1 of such size as to inclose the two reels, and one side of the body is open and is adapted to be closed by a cover 2 attached at its rear edge by hinges 3 to the body. This cover has formed around its edges a rim or flange 4 which overlaps the body and engages a circumferential bead 5, whereby the cover and body form practically a fireproof housing for the film and reels. The closed side of the body is suitably fastened to a metal frame $a$ which forms a supporting bracket and gives rigidity to the box. Fastened to this frame or bracket is a horizontal shelf 6, to the under side of which is fastened in pendent position the motor D. The frame or bracket $a$ has apertured lugs 7 through which pass screws or equivalent fastenings 8 for securing the apparatus to a vertical support or wall, there being felt or equivalent sound-deadening washers 9 employed between the wall 10 and lugs 7 and screws 8. The frame $a$ is formed with upper and lower bearings 11 and 12 in which are journaled the axles 13 and 14 for the upper and lower reels B and C. The upper axle is adapted to receive the filled reel while the lower axle is adapted to receive the empty reel which is positively driven so as to rewind the film thereon. A suitable driving means, such as a belt 15 and pulleys 16 and 17 on the motor shaft and shaft 14 respectively, is employed. By placing the filled reel at the top the free end hangs down and is more easily slipped into the lower empty reel. To prevent spinning or over-travel of the upper reel, a friction clutch is provided. This comprises a disk or washer 18 on the shaft 13, which disk is pressed by a spring 19 bearing against a washer 20. The washer 18 is fastened to the shaft 13 so as to rotate therewith, while the washer 20 may be stationary. The friction or slip engagement of the clutch members permits the upper reel to rotate only under the pull of the film as the same winds on the lower reel.

In order to stop the motor when the film is rewound, a member 21 is arranged in the bottom of the box and is adapted to be slapped by the free end of the film as the fully wound lower reel rotates. This slapping of the member 21 throws the same from the full to the dotted-line position, Fig. 3. The member 21 is fastened to a horizontal axle 24 which extends out of the box and connects with a movable switch contact 25 of the cut-out switch E, such movable contact normally engaging a fixed contact 26, as shown in Figs. 1 and 5. When the member 21 swings from the full to the dotted-line position, Fig. 5, by the end of the film striking it, the circuit is broken between the points 25 and 26, so that the motor will stop. To hold the contacts 25 and 26 in engagement, an armature 27 is fastened to the shaft or axle 24 but insulated therefrom, and a magnet 28 is employed to hold this armature in a position that normally maintains the contact 25 in engagement with the contact 26. The attraction of the magnet 28, however, is so slight that the cut-out switch will open by the film striking the member 21, although ordinary vibrations will not cause the circuit to open, due to the magnet 28 preventing this. The armature 27 is provided with a knob, so that the cut-out switch can be opened or closed by hand. The parts of the cut-out switch are inclosed in a suitable casing 30 which has a slot 31 through which the armature or member 27 extends. The circuit of the motor contains a snap or equivalent switch 32, which, after the cut-out switch E is closed, completes the circuit, so that the motor will operate.

A rewinding device of the character referred to is of special utility because it can be used in the operator's room at all times without danger of fire, and by the use of a motor the rewinding of the film is quickly done and dispenses with the services of an extra person for this purpose. The box may be employed to store a filled reel in readiness for the moving picture machine. The changing of the position of the reels, the attaching of the last end of a film to the empty reel, and the operation of the machine are extremely simple. The mere turning of the switch starts the machine and it takes care of itself. When the film is completely wound, shutting off the power and stopping the machine takes place automatically.

From the foregoing description taken in connection with the accompanying drawing, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. A film rewinding apparatus comprising a supporting structure, axles thereon, reels on the axles, a motor for driving one of the axles, a cut-out switch for the motor, and means located in the path of the free end of the rewound film for operating the said cut-out switch.

2. A film rewinding apparatus comprising a box, axles therein, reels on the axles, an electric motor connected with one of the axles for driving the same, a cut-out switch for the motor circuit and including a movable contact, and a member connected with the movable contact and arranged in such a position that the free end of the rewound film will strike the member and open the switch.

3. In a film rewinding apparatus, a winding reel, a motor for driving the same, a cut-out switch for the motor, and means located adjacent the reel and connected with the switch for operating the same by a blow from the free end of the rewound film, said means being normally out of contact with the film.

4. A film rewinding apparatus comprising a box, a reel therein on which the film winds, a motor for driving a reel, a cut-out switch included in the circuit of the motor and having a movable element, and a member connected with the element and disposed within the box in a position to be struck by the free end of the rewound film.

5. A film rewinding apparatus comprising a box, a reel therein on which the film winds, a motor for driving the reel, a cut-out switch included in the circuit of the motor and having a movable element, a member connected with the element and disposed within the box in a position to be struck by the free end of the rewound film, and magnetic means for holding the movable element of the cut-out switch in closed circuit position, with a force less than the force of the blow imparted by the free end of the film.

WILLIAM O. WORMAN.